United States Patent
Ahn et al.

(10) Patent No.: US 10,263,242 B2
(45) Date of Patent: Apr. 16, 2019

(54) ANODE FOR LITHIUM SECONDARY BATTERY AND LITHIUM SECONDARY BATTERY INCLUDING THE SAME

(71) Applicant: LG Chem, Ltd., Seoul (KR)

(72) Inventors: Byoung Hoon Ahn, Daejeon (KR); Joon Sung Bae, Daejeon (KR); Chang Wan Koo, Daejeon (KR)

(73) Assignee: LG Chem, Ltd. (KR)

( * ) Notice: Subject to any disclaimer, the term of this patent is extended or adjusted under 35 U.S.C. 154(b) by 106 days.

(21) Appl. No.: 15/403,678

(22) Filed: Jan. 11, 2017

(65) Prior Publication Data

US 2017/0125788 A1    May 4, 2017

Related U.S. Application Data (60) Division of application No. 14/297,756, filed on Jun. 6, 2014, now Pat. No. 9,583,756, which is a
(Continued)

(30) Foreign Application Priority Data

Jan. 25, 2013  (KR) ........................ 10-2013-0008785
Jan. 21, 2014  (KR) ........................ 10-2014-0007308

(51) Int. Cl.
   *H01M 10/02*   (2006.01)
   *H01M 4/04*    (2006.01)
   (Continued)

(52) U.S. Cl.
   CPC ....... *H01M 4/0404* (2013.01); *H01M 4/0435* (2013.01); *H01M 4/133* (2013.01);
   (Continued)

(58) Field of Classification Search
   CPC ........... H01M 4/0404; H01M 10/0525; H01M 4/133; H01M 4/583; H01M 4/622;
   (Continued)

(56) References Cited

U.S. PATENT DOCUMENTS

2001/0031391 A1*  10/2001  Hironaka ................ H01M 2/06
                                                         429/94
2007/0281214 A1   12/2007  Saruwatari et al.
   (Continued)

FOREIGN PATENT DOCUMENTS

CN    102263287 A    11/2011
CN    102361069 A    2/2012
   (Continued)

OTHER PUBLICATIONS

International Search Report for PCT/KR2014/000636, dated May 7, 2014.
   (Continued)

*Primary Examiner* — Cynthia K Walls
(74) *Attorney, Agent, or Firm* — Lerner, David, Littenberg, Krumholz & Mentlik, LLP (57) ABSTRACT

Provided is an anode for a lithium secondary battery composed of a multi-layered structure including an electrode current collector, a first anode active material layer including a first anode active material formed on the electrode current collector, and a second anode active material layer including a second anode active material having relatively lower press density and relatively larger average particle diameter than the first anode active material.

Since an anode according to an embodiment of the present invention may include a multi-layered active material layer including two kinds of anode active materials having different press densities and average particle diameters on an electrode current collector, porosity of the surface of the
(Continued)

electrode may be improved even after a press process to improve ion mobility into the electrode. Thus, charge characteristics and cycle life of a lithium secondary battery may be improved.

14 Claims, 5 Drawing Sheets

Related U.S. Application Data continuation of application No. PCT/KR2014/000636, filed on Jan. 22, 2014.

(51) Int. Cl.
| | | |
|---|---|---|
| *H01M 4/1393* | (2010.01) | |
| *H01M 4/36* | (2006.01) | |
| *H01M 4/587* | (2010.01) | |
| *H01M 4/62* | (2006.01) | |
| *H01M 4/583* | (2010.01) | |
| *H01M 4/133* | (2010.01) | |
| *H01M 10/0525* | (2010.01) | |
| *H01M 10/052* | (2010.01) | |
| *H01M 4/02* | (2006.01) | |

(52) U.S. Cl.
CPC ......... *H01M 4/1393* (2013.01); *H01M 4/366* (2013.01); *H01M 4/583* (2013.01); *H01M 4/587* (2013.01); *H01M 4/622* (2013.01); *H01M 10/0525* (2013.01); *H01M 10/052* (2013.01); *H01M 2004/021* (2013.01); *H01M 2220/20* (2013.01); *Y02E 60/122* (2013.01); *Y02P 70/54* (2015.11); *Y02T 10/7011* (2013.01); *Y10T 29/49117* (2015.01)

(58) Field of Classification Search
CPC .. H01M 4/366; H01M 4/0435; H01M 4/1393; H01M 4/587; H01M 2004/021; H01M 2220/20; H01M 10/052; Y02E 60/122; Y02P 70/54; Y02T 10/7011; Y10T 29/49117
See application file for complete search history.

(56) References Cited

U.S. PATENT DOCUMENTS

| | | | |
|---|---|---|---|
| 2008/0057401 A1 | 3/2008 | Mori et al. | |
| 2008/0241685 A1 | 10/2008 | Hinoki et al. | |
| 2008/0241696 A1 | 10/2008 | Hinoki et al. | |
| 2009/0081551 A1* | 3/2009 | Hoshina ................ | H01M 4/131 429/231.95 |
| 2011/0123866 A1 | 5/2011 | Pan et al. | |
| 2011/0151322 A1* | 6/2011 | Joo ....................... | H01M 4/134 429/209 |
| 2011/0168550 A1 | 7/2011 | Wang et al. | |
| 2011/0244322 A1 | 10/2011 | Hong et al. | |
| 2012/0050949 A1 | 3/2012 | Kim et al. | |
| 2013/0022867 A1 | 1/2013 | Suzuki | |
| 2013/0149439 A1 | 6/2013 | Ujihara et al. | |
| 2013/0252111 A1 | 9/2013 | Takahata et al. | |
| 2014/0220416 A1 | 8/2014 | Yoshida et al. | |

FOREIGN PATENT DOCUMENTS

| | | |
|---|---|---|
| JP | 2003077542 A | 3/2003 |
| JP | 2007214038 A | 8/2007 |
| JP | 2008-059999 A | 3/2008 |
| JP | 2008277156 A | 11/2008 |
| JP | 2009064574 A | 3/2009 |
| JP | 201092649 A | 4/2010 |
| KR | 19990085021 | 12/1999 |
| KR | 20100062719 A | 6/2010 |
| KR | 20120020894 A | 3/2012 |
| KR | 20120093487 A | 8/2012 |
| WO | 2012077176 A1 | 6/2012 |

OTHER PUBLICATIONS

Extended search report from European Application No. 14741185.4, dated Apr. 25, 2016.
Chinese Search Report for Application No. CN201710133765.6 dated Jan. 4, 2019.

* cited by examiner

ANODE FOR LITHIUM SECONDARY BATTERY AND LITHIUM SECONDARY BATTERY INCLUDING THE SAME

CROSS-REFERENCE TO RELATED APPLICATIONS

The present application is a divisional of U.S. application Ser. No. 14/297,756 filed on Jun. 6, 2014, which is a continuation of International Application No. PCT/KR2014/000636 filed on Jan. 22, 2014, which claims the benefit of Korean Patent Application No. 10-2014-0007308, filed on Jan. 21, 2014 and Korean Patent Application No. 10-2013-0008785, filed on Jan. 25, 2013, the disclosures of which are incorporated herein by reference.

TECHNICAL FIELD

The present invention relates to an anode for a lithium secondary battery and a lithium secondary battery including the same, and more particularly, to an anode including a multi-layered active material layer, in which press densities and average particle diameters of anode active materials are different from each another, and a lithium secondary battery including the anode.

BACKGROUND ART

In line with an increase in the price of energy sources due to the depletion of fossil fuels and amplification of interests in environmental pollution, environmentally-friendly alternative energies have become an indispensable element for future life. Thus, research into various power generation techniques using natural energy resources, such as sunlight, wind, and tides, has continuously conducted, and great interests in power storage devices for more efficiently using the energy thus generated have also grown.

In particular, the demand for secondary batteries as an environmentally-friendly alternative energy source has rapidly increased as the technology development and demand for mobile devices have increased. The secondary batteries are recently being used as power sources of devices requiring large power, such as electric vehicles (EVs) or hybrid electric vehicles (HEVs), and the application area has been extended to include uses, such as an auxiliary power source through power grids and the like.

In order for the secondary batteries to be used as the power sources of the devices requiring large power, high energy density, excellent safety, and long cycle life are necessarily required in addition to characteristics of generating large output in a short period of time, for example, the batteries must be used for 10 years or more even under severe conditions in which high-current charge and discharge are repeated in a short period of time.

Lithium metal has been used as an anode of a typical lithium secondary battery. However, since it has been known that a battery short circuit may occur due to the formation of dendrites and there is a risk of explosion due to the short circuit, the lithium metal is being replaced by a carbon-base compound capable of reversibly intercalating and deintercalating lithium ions as well as maintaining structural and electrical properties.

Since the carbon-based compound has a very low discharge voltage of about −3 V with respect to a hydrogen standard electrode potential and exhibits highly reversible charge and discharge behavior due to the uniaxial orientation of a graphene layer, the carbon-based compound exhibits excellent electrode cycle life. Also, since the carbon-based compound may exhibit a potential that is almost similar to pure lithium metal, i.e., the electrode potential of the carbon-based compound is 0 V Li/Li$^+$during lithium (Li)-ion charge, higher energy may be obtained when a battery is formed with an oxide-based cathode.

Figure 1:
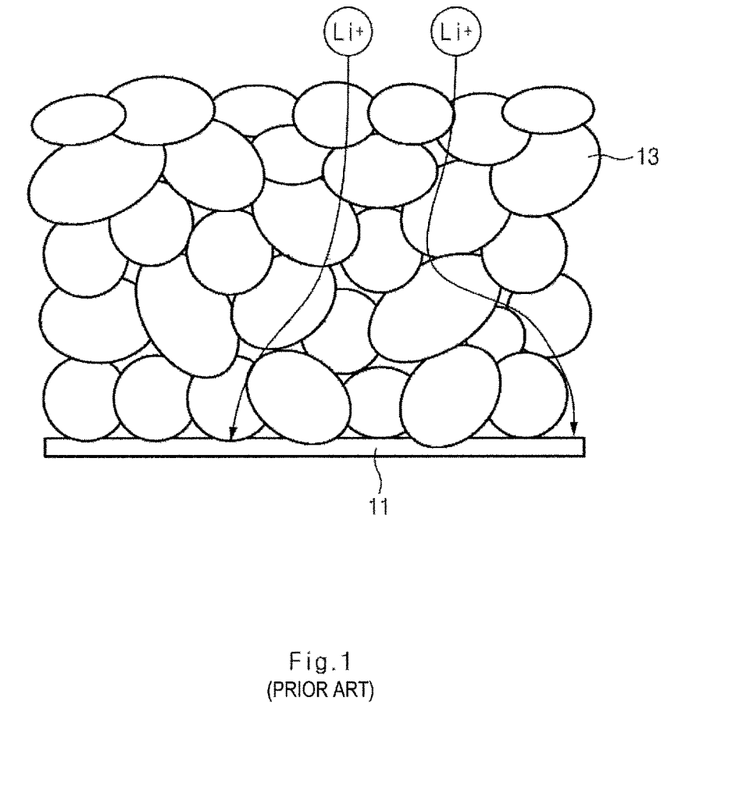
FIG. 1 is a schematic view illustrating an anode structure composed of a typical single-layered active material layer.

The anode for a secondary battery may be prepared by a method, in which a single anode active material slurry is prepared by mixing a carbon material as an anode active material 13 with a conductive agent and a binder if necessary, and an electrode current collector 11, such as a copper foil, is then coated with a single layer of the slurry and dried. In this case, a press process is performed during the slurry coating in order to press active material powder to the current collector and obtain a uniform thickness of the electrode (see FIG. 1).

However, during a typical press process of an electrode, surface porosity may decrease as the depression of a surface is intensified in comparison to the inside of an anode active material.

Since such a phenomenon may be further intensified when the thickness of the electrode is high, an electrolyte solution may be difficult to penetrate into the electrode. Accordingly, ion transfer path may not be secured and thus, ions may not be smoothly transferred to cause degradation of battery performance and cycle life.

DISCLOSURE OF THE INVENTION

Technical Problem

According to an aspect of the present invention, the present invention provides an anode, in which ion mobility into the electrode is improved by including a multi-layered active material layer in the anode.

According to another aspect of the present invention, there is provided a lithium secondary battery, in which charge characteristics and cycle life of the battery are improved by including the anode.

Technical Solution

According to an aspect of the present invention,there is provided an anode including: an electrode current collector; and a multi-layered active material layer formed on the electrode current collector, wherein the multi-layered active material layer includes a first anode active material layer including a first anode active material; and a second anode active material layer including a second anode active material having a lower press density and a larger average particle diameter than the first anode active material.

According to another aspect of the present invention, there is provided a lithium secondary battery including the anode.

Advantageous Effects

Since an anode according to an embodiment of the present invention may include a multi-layered active material layer including two kinds of anode active materials having different press densities and average particle diameters on an electrode current collector, porosity of the surface of the electrode may be improved even after a press process to improve ion mobility into the electrode. Thus, charge characteristics and cycle life of a lithium secondary battery may be improved.

MODE FOR CARRYING OUT THE INVENTION

Hereinafter, the present invention will be described in detail.

Figure 2:
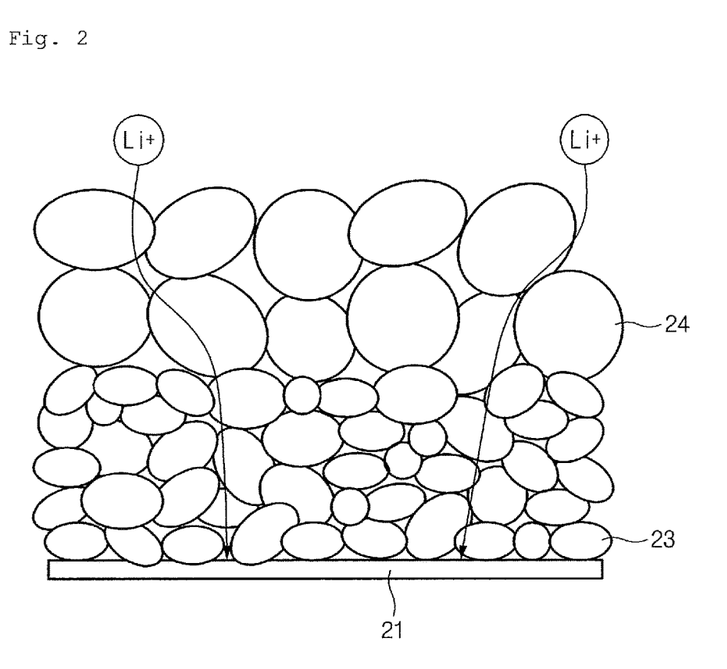
FIG. 2 is a schematic view illustrating an anode structure composed of a multi-layered active material layer according to an embodiment of the present invention.

As illustrated in a schematic view of FIG. 2, an anode according to an embodiment of the present invention includes an electrode current collector 21; and a multi-layered active material layer formed on the electrode current collector, wherein the multi-layered active material layer may include a first anode active material layer (A) including a first anode active material 23; and a second anode active material layer (B) including a second anode active material 24 having a relatively lower press density and a relatively larger average particle diameter than the first anode active material.

Since the anode according to the embodiment of the present invention includes the multi-layered active material layer including two kinds of anode active materials having different press densities and average particle diameters on the electrode current collector, porosity of the surface of the electrode may be improved even after a press process to improve ion mobility into the electrode. Thus, charge characteristics and cycle life of a lithium secondary battery may be improved.

First, the electrode current collector may be one or more selected from the group consisting of stainless steel; aluminum; nickel; titanium; fired carbon; copper; stainless steel surface treated with carbon, nickel, titanium, or silver; an aluminum-cadmium alloy; a non-conductive polymer surface treated with a conductive agent; and a conductive polymer.

Also, in the anode according to the present invention, the first anode active material and the second anode active material may include crystalline carbon, such as natural graphite and artificial graphite having a maximum theoretical capacity limit of 372 mAh/g (844 mAh/cc); amorphous carbon such as soft carbon and hard carbon; or a mixture thereof, in order to secure high energy density.

Specifically, the first anode active material and the second anode active material may each be the same (same kind) crystalline carbon, such as natural graphite and artificial graphite, having a spherical or spherical-like shape, or may be different materials.

Furthermore, in the anode according to the embodiment of the present invention, a ratio of the average particle diameter of the first anode active material to the average particle diameter of the second anode active material may be in a range of 1:9 to 5:5.1, for example, 1:1.3 to 1:4. As a non-limiting example, the average particle diameter of the first anode active material may be about 20 μm or less, and for example, may be in a range of 10 μm to 18 μm.

The average particle diameter of the anode active material according to an embodiment of the present invention, for example, may be measured using a laser diffraction method. The laser diffraction method may generally measure a particle diameter ranging from a submicron level to a few mm, and may obtain highly repeatable and high resolution results. The average particle diameter ($D_{50}$) of the anode active material may be defined as a particle diameter at 50% in a cumulative particle diameter distribution.

Also, in the anode according to the embodiment of the present invention, a ratio of the press density of the first anode active material to the press density of the second anode active material may be in a range of 1.1:1 to 3:1, for example, 1.1:1 to 1.5:1 under a pressure of 12 MPa to 16 MPa.

According to an embodiment of the present invention, the pressure densities of the first anode active material and the second active material are not particularly limited as long as the first anode active material and the second active material satisfy the above range of the press density. However, for example, the press density of the first anode active material may be in a range of 1.4 g/cc to 1.85 g/cc under a pressure of 12 MPa to 16 MPa, and the press density of the second anode active material may be in a range of 1.4 g/cc to 1.6 g/cc under a pressure of 12 MPa to 16 MPa.

The press density compares the degree to which particles of the anode active material are deformed, wherein the lower the press density value, the higher the compressive strength is when pressed at the same pressure. The press densities of the first anode active material and the second active material, for example, may be measured using a powder resistivity meter, MCP-PD51, by Mitsubishi Chemical Corporation. With respect to the above powder resistivity meter, a predetermined amount of anode active material powder is put in a cylinder-type load cell, a force is continuously applied thereto, and density is measured while particles are pressed. Since the particles are less pressed at the same pressure as the strength of the particles is high, the measured density may be low.

Also, in the anode according to the embodiment of the present invention, a ratio of compressive strength of the first anode active material to compressive strength of the second anode active material may be in a range of 2:8 to 5:5.1, for example, 2:8 to 4:7 under a pressure of 12 MPa to 16 MPa.

Furthermore, a porosity based on a total volume of the first anode active material layer, for example, a ratio of pores having a diameter of 0.1 μm to 10 μm included in the first anode active material layer, may be in a range of about 10 wt % to about 50 wt %, and a porosity based on a total volume of the second anode active material layer may be in a range of about 10 wt % to about 50 wt %. In this case, a pore diameter and/or the porosity of the second anode active material layer may be relatively larger or higher than those of the first anode active material layer. For example, in a case where the porosities of the first anode active material layer and the second active material layer are the same 27%, the diameter of the pores between the active materials of the first anode active material layer may be in a range of 0.4 μm to 3 μm, and the diameter of the pores between the active materials of the second anode active material layer may be in a range of 0.5 μm to 3.5 μm.

That is, with respect to the anode of the present invention, since the second anode active material layer formed of the second anode active material having relative lower press density and larger average particle diameter is formed on the first anode active material layer formed of the first anode active material having relative higher press density and smaller average particle diameter than the second anode active material, the porosity of the surface of the anode active material layer may be increased. Thus, damage to the surface of the anode active material layer during the press process may be prevented and the pore structure in the electrode may be improved.

In a case where an electrode formed of a typical single-layered active material layer is formed, since the pressure may not be transferred to the inside of the electrode during a press process due to low strength characteristics of the single soft anode active material layer, only the anode active material disposed on the surface of the electrode is severely pressed. For example, in a case where an electrode is also formed of only a single-layered active material layer having low press density and large average particle diameter such as the second anode active material layer, only the anode active material disposed on the surface of the electrode is severely pressed due to low strength characteristics of the single anode active material layer during a press process. As a result, porosity between the anode active materials disposed on the surface of the electrode may be decreased to reduce ion mobility into the electrode. Such a phenomenon may be intensified as the thickness of the anode increases or the density increases.

However, when two or more kinds of anode active materials having high strength due to different press densities and average particle diameters, particularly, anode active materials in which the press density of the second anode active material layer is relatively lower than that of the first anode active layer, are used as in the present invention, the depression phenomenon of the electrode surface during a press process may be alleviated as the compressive strength of the anode active material coated near the surface of the electrode is higher. Therefore, since the porosity of the surface of the electrode, i.e., the second anode active material layer becomes higher in comparison to the inside of the electrode, i.e., the first anode active material layer, it becomes favorable to the ion mobility into the electrode. Thus, the ion mobility may be improved (see FIG. 2).

The first and second anode active materials of the present invention may further include a conductive agent and a binder if necessary.

In this case, examples of the conductive agent may be nickel powder, cobalt oxide, titanium oxide, and carbon. The carbon may include any one selected from the group consisting of Ketjen black, acetylene black, furnace black, graphite, carbon fibers, and fullerene, or a mixture of two or more thereof.

Also, all binder resins used in a typical lithium secondary battery may be used as the binder, and examples of the binder may be any one selected from the group consisting of polyvinylidene fluoride, carboxymethyl cellulose, methyl cellulose, and sodium polyacrylate, or a mixture of two or more thereof.

Furthermore, according to an embodiment of the present invention, provide is a method of preparing an anode for a lithium secondary battery including: coating an electrode current collector with a first anode active material slurry including a first anode active material and a binder resin; forming a first anode active material layer by drying the first anode active material slurry; coating the first anode active material layer with a second anode active material slurry including a second anode active material and a binder resin; forming a second anode active material layer by drying the second anode active material slurry; and pressing the electrode current collector on which the first and second anode active material layers are formed.

Also, in the method, the second anode active material slurry may be coated before the first anode active material slurry is dried. That is, the coating of the first anode active material slurry and the second active material slurry may be continuously performed without the drying, and the drying of the coated slurry and the pressing may also be performed at once.

The pressing process may be performed under the same condition as a typical method of preparing an electrode.

In the method of the present invention, a pore diameter of the first anode active material layer before the press process is in a range of about 1 μm to 20 μm, and a porosity based on a total volume of the first anode active material layer is about 50%. However, the pore diameter of the first anode active material layer after the press process may be in a range of about 0.1 μm to 3 μm, and the porosity based on the total volume of the first anode active material layer may be in a range of about 10% to about 50%.

Also, a pore diameter of the second anode active material layer before the press process is in a range of about 1 μm to about 30 μm, and a porosity based on a total volume of the second anode active material layer is about 50%. However, the pore diameter of the second anode active material layer after the press process is in a range of about 0.1 μm to about 5 μm, and the porosity based on the total volume of the second anode active material layer is in a range of about 10% to about 50%.

In the first anode active material layer and the second anode active material layer, a ratio of the porosities before the press may be in a range of 5:5.1 to 4:6, and a ratio of the porosities after the press may be in a range of 5:5.1 to 2:8.

Furthermore, the pore diameter and/or the porosity of the second anode active material layer may be relatively larger or higher than those of the first anode active material layer. For example, in a case where the ratio of the porosity of the first anode active material layer to the porosity of the second anode active material layer is 4:6 (20%:30%), the pore diameter of the first anode active material layer may be in a range of 0.4 μm to 3 μm, and the pore diameter of the second anode active material layer may be in a range of 0.5 μm to 3.5 μm.

Typically, pores having a diameter of 0.1 μm to 10 μm may act to improve wetting speed of the electrolyte solution and transfer speed of lithium ions in an anode in which an anode active material is used. When the anode composed of only a typical single-layered active material layer is used, the porosity of the anode after a press process, for example, the ratio of pores having a diameter of 5 μm or more, is decreased to 50% or less, and thus, the density may increase.

The measurement of the porosity is not particularly limited, and according to an embodiment of the present invention, the porosity, for example, may be measured by a Brunauer-Emmett-Teller (BET) method or mercury (Hg) porosimetry.

Since the present invention may provide an anode composed of a multi-layered active material layer using two kinds of anode active materials having different press densities and average particle diameters, the porosity in an upper portion of the anode is relatively higher than that in a lower portion of the anode even after the press process. Thus, the density of the upper portion of the anode may be decreased. Therefore, the electrode may be easily impregnated with the electrolyte solution and the ion mobility may also be improved. In addition, the surface of an electrode may maintain the form of an active material which is not easily broken or pressed even during a subsequent press process for preparing the electrode.

Also, the present invention may provide a lithium secondary battery which is prepared by encapsulating the anode, a cathode, a separator, and an electrolyte into a battery case using a typical method.

Any cathode may be used as the cathode without limitation as long as it is a typical cathode used in the preparation of a lithium secondary battery. For example, an electrode current collector is coated with a slurry in which cathode active material powder, a binder, and a conductive agent are mixed, and dried. Then, the cathode may then be formed by pressing.

Examples of the cathode active material may be any one selected from the group consisting of $LiMn_2O_4$, $LiCoO_2$, $LiNiO_2$, $LiFeO_2$, and $V_2O_5$, or a mixture of two or more thereof. Also, compounds capable of intercalating and deintercalating lithium, such as TiS, MoS, an organic disulfide compound, or an organic polysulfide compound, may be used.

Examples of the binder may be polyvinylidene fluoride, carboxymethyl cellulose, methyl cellulose, sodium polyacrylate, etc. Examples of the conductive agent may be conductive auxiliary materials such as acetylene black, furnace black, graphite, carbon fibers, and fullerene.

Also, any separator may be used as long as it is used in a lithium secondary battery, and for example, may include polyethylene, polypropylene, or a multilayer thereof; polyvinylidene fluoride; polyamide; and glass fibers.

Examples of the electrolyte of the lithium secondary battery may be an organic electrolyte solution, in which a lithium salt is dissolved in a non-aqueous solvent, or a polymer electrolyte solution.

Examples of the non-aqueous solvent constituting the organic electrolyte solution may be non-aqueous solvents, such as propylene carbonate, ethylene carbonate, butylene carbonate, benzonitrile, acetonitrile, tetrahydrofuran, 2-methyl tetrahydrofuran, γ-butyrolactone, dioxolane, 4-methyl dioxolane, N,N-dimethylformamide, dimethylacetoamide, dimethyl sulfoxide, dioxane, 1,2-dimethoxyethane, sulfolane, dichloroethane, chlorobenzene, nitrobenzene, dimethyl carbonate, methyl ethyl carbonate, diethyl carbonate, methyl propyl carbonate, methyl isopropyl carbonate, ethyl butyl carbonate, dipropyl carbonate, diisopropyl carbonate, dibutyl carbonate, diethylene glycol, and dimethyl ether, or a mixed solvent of two or more thereof, or a solvent typically known as a solvent for a lithium secondary battery. In particular, a solvent may be used, in which one of dimethyl carbonate, methyl ethyl carbonate, and diethyl carbonate is mixed with a solvent including one of propylene carbonate, ethylene carbonate, and butylene carbonate.

One or more lithium salts selected from the group consisting of LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, and lithium tetraphenyl borate may be used as the lithium salt.

Examples of the polymer electrolyte solution may include the organic electrolyte solution and (co)polymers, such as polyethylene oxide, polypropylene oxide, polyacetonitrile, polyvinylidene fluoride, polymethacrylate, and polymethylmethacrylate, which have excellent swelling property with respect to the organic electrolyte solution.

Since the secondary battery according to the present invention may exhibit high energy density, high output characteristics, improved safety, and stability, the secondary battery may be particularly suitable for a battery constituting a medium and large sized battery module. Therefore, the present invention may also provide a medium and large sized battery module including the secondary battery as a unit cell.

The medium and large sized battery module may be suitable for power sources requiring high output and high capacity, such as an electric vehicle, a hybrid electric vehicle, and a power storage device.

Hereinafter, the present invention will be described in more detail, according to examples and experimental examples. However, the following examples are merely presented to exemplify the present invention, and the scope of the present invention is not limited thereto.

EXAMPLE 1

97.3 parts by weight of a first anode active material (artificial graphite) in which press density was 1.79 g/cc when a pressure of 12.3 MPa was applied, 0.7 parts by weight of a conductive agent (Super-P), 1.0 part by weight of a thickener (carboxymethyl cellulose), and 1.0 part by weight of a binder (styrene-butadiene rubber) were mixed to prepare a first anode active material slurry.

Subsequently, 97.3 parts by weight of a second anode active material (artificial graphite) in which press density was 1.51 g/cc when a pressure of 12.3 MPa was applied, 0.7 parts by weight of a conductive agent (Super-P), 1.0 part by weight of a thickener (carboxymethyl cellulose), and 1.0 part by weight of a binder (styrene-butadiene rubber) were mixed to prepare a second anode active material slurry.

A copper current collector was sequentially coated with the first anode active material slurry and the second active material slurry, and then dried to form a multi-layered active material layer in which first and second active material layers were stacked.

Next, an anode, in which the multi-layered active material layer was formed, was pressed using a roll press. In this case, the anode density was 1.6 g/cc. Also, another anode having an anode density of 1.64 g/cc was prepared by using the same method.

Subsequently, a cathode active material slurry was prepared by dispersing 97.2 parts by weight of a cathode active material ($LiCoO_2$), 1.5 parts by weight of a binder (polyvinylidene fluoride), and 1.3 parts by weight of a conductive agent (Super-P) in N-methylpyrrolidone. An aluminum current collector was coated with the slurry and then pressed using a roll press to prepare a cathode (cathode density: 3.4 g/cc).

A polyethylene separator was disposed between the anode and the cathode, and the product thus obtained was put into a battery case. Then, a secondary battery was prepared by injecting an electrolyte solution. In this case, the electrolyte solution, in which 1.0 M $LiPF_6$ was dissolved in a mixed solution of ethylene carbonate/ethylmethyl carbonate/diethyl carbonate (volume ratio of 1/2/1), was used to prepare the secondary battery.

COMPARATIVE EXAMPLE 1

97.3 parts by weight of an anode active material (artificial graphite) in which anode density was 1.51 g/cc when a pressure of 12.3 MPa was applied, 0.7 parts by weight of a conductive agent (Super-P), 1.0 part by weight of a thickener (carboxymethyl cellulose), and 1.0 part by weight of a binder (styrene-butadiene rubber) were mixed to prepare an anode active material slurry.

A copper current collector was coated with the anode active material slurry, and then dried to form a single-layered active material layer. Thereafter, two kinds of anodes having an anode density of 1.6 g/cc and 1.64 g/cc and secondary batteries were prepared in the same manner as in Example 1.

COMPARATIVE EXAMPLE 2

An anode having an anode density of 1.6 g/cc and a secondary battery were prepared in the same manner as in Example 1 except that an anode active material was used, in which anode density was 1.79 g/cc when a pressure of 12.3 MPa was applied.

EXPERIMENTAL EXAMPLE 1

Press Density and Average Particle Diameter Measurement

Press densities of particles of the anode active materials prepared in Example 1 and Comparative Examples 1 and 2 were measured using a powder resistivity meter, MCP-PD51, by Mitsubishi Chemical Corporation.

With respect to the above powder resistivity meter, a predetermined amount of anode active material powder was put in a cylinder-type load cell, a force was continuously applied thereto, and density was measured while particles were pressed. Since the particles were less pressed at the same pressure as the strength of the anode active material particles was high, the measured density may be low. In this case, the applied pressure was in a range of about 12 MPa to about 16 MPa.

Average particle diameters of the anode active materials prepared in Example 1 and Comparative Examples 1 and 2 were measured using a laser diffraction method.

The press densities and average particle diameters of the particles thus measured are presented in Table 1 below.

TABLE 1

| Example | Press density (g/cc at MPa) | | Average particle diameter (μm) | |
|---|---|---|---|---|
| | First anode active material | Second anode active material | First anode active material | Second anode active material |
| Example 1 | 1.79 g/cc | 1.51 g/cc | 16 μm | 26 μm |
| Comparative Example 1 | 1.51 g/cc | | 26 μm | |
| Comparative Example 2 | 1.79 g/cc | | 16 μm | |

EXPERIMENTAL EXAMPLE 2

Charge Characteristics

In order to evaluate charge characteristics of the secondary batteries prepared in Example 1 and Comparative Examples 1 and 2, the secondary batteries prepared in Example 1 and Comparative Examples 1 and 2 were charged at 0.1 C to 4.2 V/0.05 C at 23° C. under a constant current/constant voltage (CC/CV) condition and then discharged at a constant current (CC) of 0.1 C to a voltage of 3 V to measure capacities twice. Thereafter, the secondary batteries were charged at 0.5 C to 4.2 V/0.05 C under a CC/CV condition and then discharged at a CC of 0.2 C to a voltage of 3 V to measure 0.5 C rate charge characteristics. The results thereof are present in FIG. 3.

Figure 3:
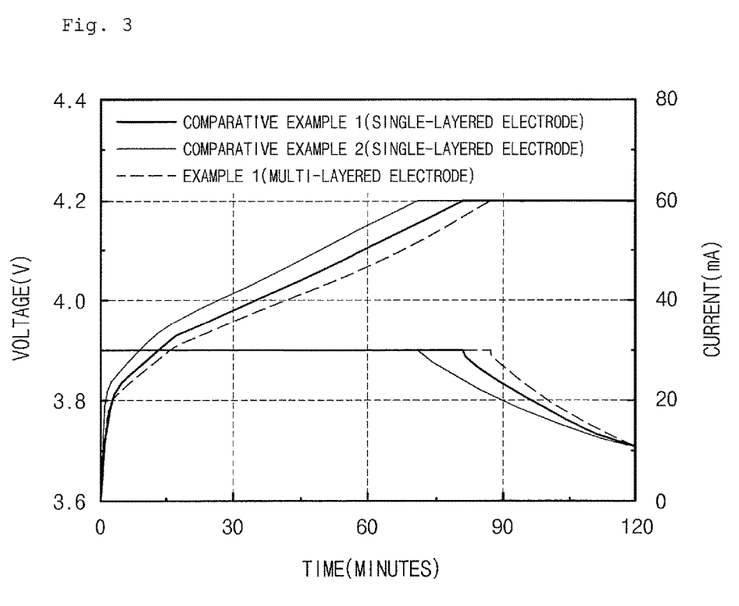
FIG. 3 is a graph illustrating charge characteristics of lithium secondary batteries of Example 1 and Comparative Examples 1 and 2, according to Experimental Example 2.

Referring to FIG. 3, when charged at a constant current of 0.5 C rate, constant current charge time of the battery of Example 1 was longer than those of the batteries of Comparative Examples 1 and 2. Therefore, it may be confirmed that charge characteristics of the battery of Example 1 having an anode including a multi-layered active material layer was better than those of the batteries of Comparative Examples 1 and 2 each having an anode including a single-layered active material layer.

EXPERIMENTAL EXAMPLE 3

Cycle Life

The secondary batteries of Example 1 and Comparative Examples 1 and 2 subjected to Experimental Example 2 were charged at 0.2 C to 4.2 V/0.05 C under a constant current/constant voltage (CC/CV) condition and then discharged at a constant current (CC) of 0.2 C to a voltage of 3 V. The charge and discharge were repeated 80 cycles. The results of cycle life thus obtained are presented in FIGS. 4 and 5.

Figure 4:
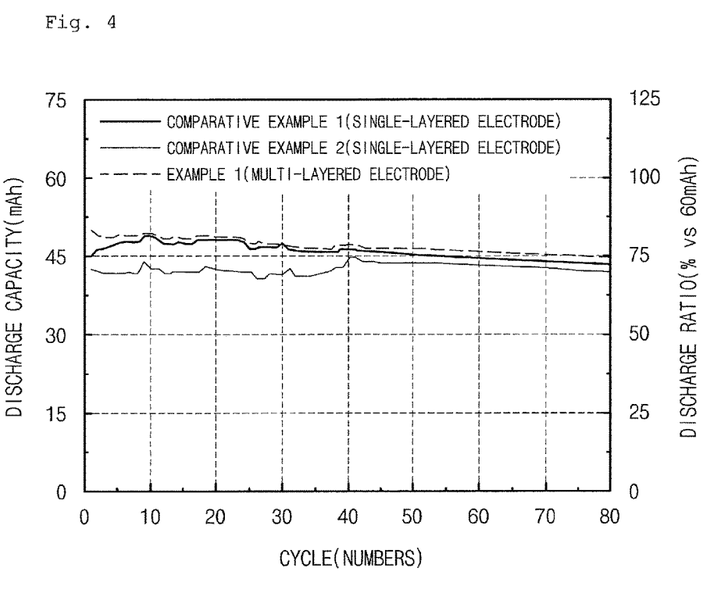
FIGS. 4 and 5 are graphs illustrating cycle life of lithium secondary batteries of Example 1 and Comparative Example 1 according to anode density, according to Experimental Example 3.
Figure 5:
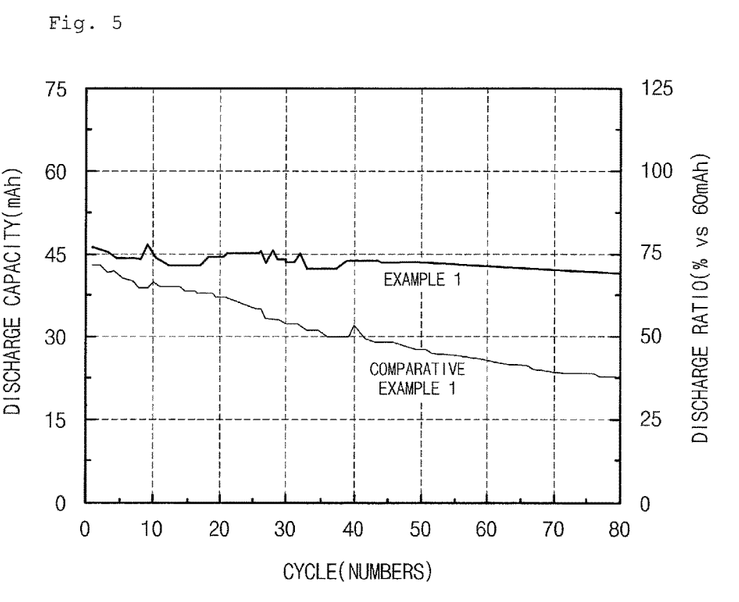

In this case, FIG. 4 represents the cycle life of the secondary batteries of Example 1 and Comparative Examples 1 and 2 each having an anode density of 1.6 g/cc, and FIG. 5 represents the cycle life of the secondary batteries of Example 1 and Comparative Example 1 each having an anode density of 1.64 g/cc.

First, referring to FIG. 4, when the anode density was low at 1.6 g/cc, it may be confirmed that the batteries of Comparative Examples 1 and 2 each having an anode including a single-layered active material layer and the battery of Example 1 having an anode including a multi-layered active material layer all exhibited a similar level of cycle life.

However, referring to FIG. 5, when the anode density increased to 1.64 g/cc, the cycle life of the anode of Example 1 including a multi-layered active material layer were excellently maintained even if the anode density was high. In contrast, with respect to the battery of Comparative Example 1 having an electrode including a single-layered anode active material, it may be confirmed that the cycle life decreased when the anode density increased.

Therefore, it may be understood that since the ion mobility into the electrode of Example 1 including the multi-layered active material layer obtained according to the present invention was improved in comparison to that of Comparative Example 1, speed and cycle characteristics were improved.

INDUSTRIAL APPLICABILITY

Since an anode according to an embodiment of the present invention may include a multi-layered active material layer including two kinds of anode active materials having different press densities and average particle diameters on an electrode current collector, porosity of the surface of the electrode may be improved even after a press process to improve ion mobility into the electrode. Thus, the anode may be suitable for lithium secondary batteries.

The invention claimed is:
1. A method of preparing an anode, the method comprising:

coating an electrode current collector with a first anode active material slurry including a first anode active material and a binder resin;

forming a first anode active material layer by drying the first anode active material slurry;

coating the first anode active material layer with a second anode active material slurry including a second anode active material and a binder resin;

forming a second anode active material layer by drying the second anode active material slurry; and pressing the electrode current collector on which the first and second anode active material layers are formed, wherein the second anode active material has a lower press density and a larger average particle diameter than the first anode material, and wherein the first anode active material and the second anode active material each comprises crystalline carbon, amorphous carbon or a mixture thereof.

2. A method of preparing an anode, the method comprising:

coating an electrode current collector with a first anode active material slurry including a first anode active material and a binder resin;

coating the first anode active material layer with a second anode active material slurry including a second anode active material and a binder resin;

forming a multi-layered anode active material layer by drying the first and second anode active material slurries; and pressing the electrode current collector on which the multi-layered anode active material layer is formed, wherein the second anode active material has a lower press density and a larger average particle diameter than the first anode material, and wherein the first anode active material and the second anode active material each comprises crystalline carbon, amorphous carbon or a mixture thereof.

3. The method of claim 1, wherein porosity of the second anode active material layer is relatively higher than porosity of the first anode active material layer.

4. The method of claim 3, wherein a ratio of the porosity of the first anode active material layer to the porosity of the second anode active material layer before press is in a range of 5:5.1 to 4:6.

5. The method of claim 3, wherein a ratio of the porosity of the first anode active material layer to the porosity of the second anode active material layer after press is in a range of 5:5.1 to 2:8.

6. The method of claim 1, wherein a ratio of the average particle diameter of the first anode active material to the average particle diameter of the second anode active material is in a range of 1:9 to 5:5.1.

7. The method of claim 1, wherein a ratio of the press density of the first anode active material to the press density of the second anode active material is in a range of 1.1:1 to 3:1 under a pressure of 12 MPa to 16 MPa.

8. The method of claim 1, wherein a ratio of compressive strength of the first anode active material to compressive strength of the second anode active material is in a range of 2:8 to 5:5.1 under a pressure of 12 MPa to 16 MPa.

9. The method of claim 2, wherein porosity of the second anode active material layer is relatively higher than porosity of the first anode active material layer.

10. The method of claim 9, wherein a ratio of the porosity of the first anode active material layer to the porosity of the second anode active material layer before press is in a range of 5:5.1 to 4:6.

11. The method of claim 9, wherein a ratio of the porosity of the first anode active material layer to the porosity of the second anode active material layer after press is in a range of 5:5.1 to 2:8.

12. The method of claim 2, wherein a ratio of the average particle diameter of the first anode active material to the average particle diameter of the second anode active material is in a range of 1:9 to 5:5.1.

13. The method of claim 2, wherein a ratio of the press density of the first anode active material to the press density of the second anode active material is in a range of 1.1:1 to 3:1 under a pressure of 12 MPa to 16 MPa.

14. The method of claim 2, wherein a ratio of compressive strength of the first anode active material to compressive strength of the second anode active material is in a range of 2:8 to 5:5.1 under a pressure of 12 MPa to 16 MPa.

* * * * *